United States Patent
Iijima et al.

[11] Patent Number: 6,146,281
[45] Date of Patent: Nov. 14, 2000

[54] OUTER JOINT PART OF A CONSTANT VELOCITY BALL JOINT

[75] Inventors: Mitsumasa Iijima; Masao Sakamoto; Tadanori Baba, all of Kanagawa, Japan

[73] Assignee: Unisia Jecs Corporation, Atsugi, Japan

[21] Appl. No.: 09/046,531

[22] Filed: Mar. 24, 1998

[30] Foreign Application Priority Data

Mar. 31, 1997  [JP]  Japan ................................. 9-094503

[51] Int. Cl.$^7$ .......................................................... F16D 3/16
[52] U.S. Cl. .......................................... 464/139; 464/906
[58] Field of Search ................................. 464/143, 141, 464/145, 906, 139, 195

[56] References Cited

U.S. PATENT DOCUMENTS

| | | | |
|---|---|---|---|
| 4,120,176 | 10/1978 | Ebbinghaus | ................................. 64/21 |
| 4,455,734 | 6/1984 | Yoshioka et al. | ........................ 464/906 |
| 4,843,864 | 7/1989 | Welschof . | |
| 4,942,652 | 7/1990 | Hazebrook et al. . | |
| 5,451,185 | 9/1995 | Krude et al. | ............................. 464/906 |
| 5,542,885 | 8/1996 | Krude et al. | ............................. 464/906 |
| 5,618,235 | 4/1997 | Krude et al. | ............................. 464/906 |
| 5,624,318 | 4/1997 | Jacob et al. | .............................. 464/906 |
| 5,647,801 | 7/1997 | Jacob | ..................................... 464/906 |
| 5,660,593 | 8/1997 | Urban et al. | ............................. 464/906 |

FOREIGN PATENT DOCUMENTS

| | | | |
|---|---|---|---|
| 004302432 | 8/1993 | Germany | ................................. 464/145 |
| 63-174939 | 11/1988 | Japan . | |
| 405202945 | 8/1993 | Japan | ..................................... 464/141 |

*Primary Examiner*—Lynne H. Browne
*Assistant Examiner*—Kenneth Thompson
*Attorney, Agent, or Firm*—Foley & Lardner

[57] ABSTRACT

An outer joint part includes a cup-shaped body portion having a rotation axis. The cup-shaped body portion has an inner circumferential surface having a plurality of circumferentially spaced inner grooves, and an outer circumferential surface having a plurality of outer grooves circumferentially alternately disposed relative to the inner grooves. The wall thickness of the cup-shaped body portion at the outer grooves is smaller than the wall thickness of the cup-shaped body portion in the areas between the outer grooves. A preform formed into the outer joint part includes a bowl-shaped preform portion having a center axis and inner and outer circumferential surfaces similar in shape to each other. The inner circumferential surface defines inner recesses circumferentially spaced from each other. The outer circumferential surface defines outer recesses circumferentially alternately disposed relative to the inner recesses.

1 Claim, 4 Drawing Sheets

OUTER JOINT PART OF A CONSTANT VELOCITY BALL JOINT

BACKGROUND OF THE INVENTION

1. Field of the Invention

The present invention relates to an outer joint part used as an outer member of a ball joint, and a preform formed into an outer joint part.

2. Description of the Related Art

One kind of such an outer joint part is disclosed in Japanese Utility Model Application First Publication No. 63-174939. The outer joint part includes a cup-shaped body portion having a plurality of grooves on its inner circumferential surface. The outer joint part is made from a preform by plastic working using outer and inner dies coaxially arranged. The preform includes a bowl-shaped portion having recesses on its inner circumferential surface. The inner die is formed with a plurality of projections on its outer peripheral surface and adapted to force the preform against the outer die such that the projections press onto the recesses of the preform. The grooves of the outer joint part are thus formed corresponding to the recesses of the preform. The preform has an outer circumferential surface of a generally circular shape in cross section.

In the preform of the conventionally proposed type described above, a preform portion formed with the recesses has a reduced thickness in a cross section taken in a radial direction of the preform and the remaining preform portion has an increased thickness in the cross section. A difference in thickness between the preform portion with the recesses and the remaining preform portion causes a difference in rigidity therebetween. The remaining preform portion is not readily deformed in plastic working as compared with the preform portion with the recesses, due to the increased rigidity greater than that of the recessed preform portion. It is likely that the preform of the conventionally proposed fails to be formed into the outer joint part having a predetermined shape on its inner circumferential surface.

Particularly, It is difficult to form the conventionally proposed preform into the outer joint part defining a generally spherical cavity and having a so-called undercut shape in which an inner diameter of the outer joint part is considerably smaller at its open end portion than at its middle bulging portion. In this case, it will be required that the finished cage is subject to machining on the inner circumferential surface in order to increase the inner diameter at the middle portion.

It is an object of the present invention to provide an outer joint part capable of being easily formed.

It is a further object of the present invention to provide a preform readily formed into the cage.

SUMMARY OF THE INVENTION

According to one aspect of the present invention, there is provided an outer joint part, comprising:

- a cup-shaped body portion having a rotation axis, the cup-shaped body portion having an inner circumferential surface and an outer circumferential surface;
- a plurality of inner grooves formed on the inner circumferential surface of the cup-shaped body portion in circumferentially distant spaced relation to each other; and
- a plurality of outer grooves formed on the outer circumferential surface of the cup-shaped body portion in circumferentially alternate relation to the plurality of inner grooves.

According to a further aspect of the present invention, there is provided a preform, comprising:

- a bowl-shaped preform portion having a center axis;
- the bowl-shaped preform portion having an inner circumferential surface and an outer circumferential surface similar in shape to the inner circumferential surface;
- the inner circumferential surface defining a plurality of inner recesses circumferentially distant from each other;
- the outer circumferential surface defining a plurality of outer recesses circumferentially alternately disposed relative to the plurality of inner recesses.

DESCRIPTION OF THE PREFERRED EMBODIMENT

Figure 1:
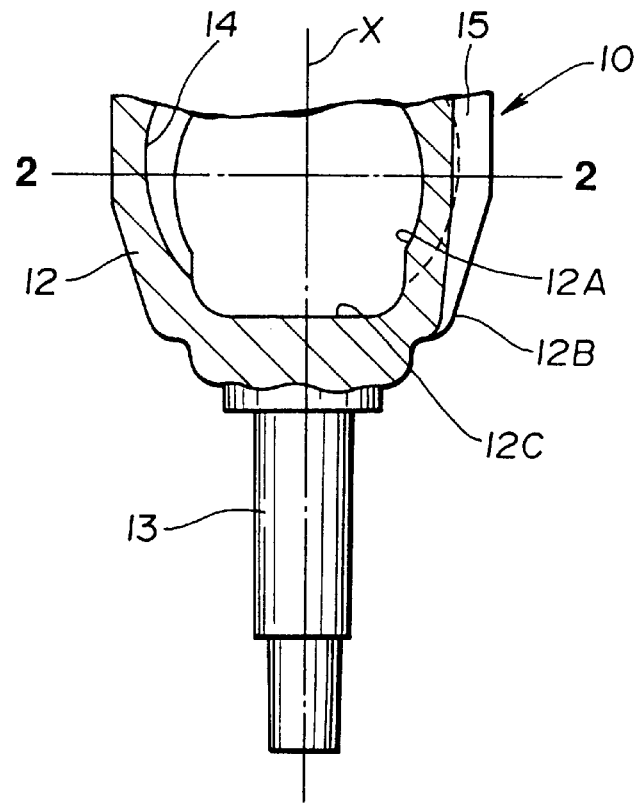
FIG. 1 is a section of an outer joint part of a preferred embodiment according to the present invention, taken along the line 1—1 of FIG. 2.
Figure 2:
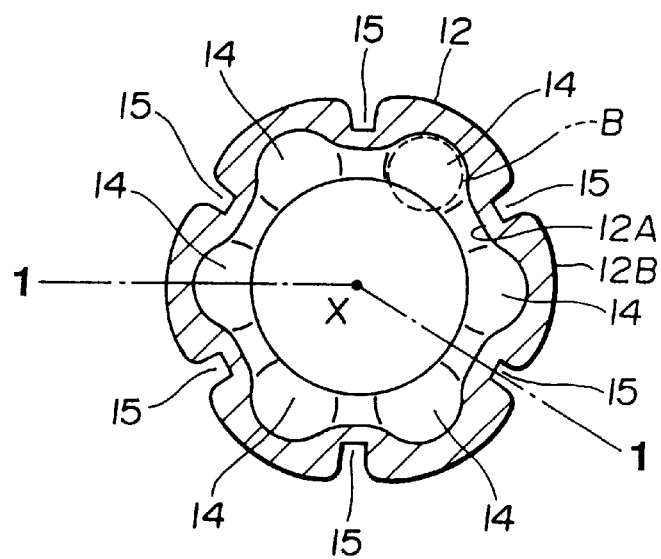
FIG. 2 is a cross section of the outer joint part shown in FIG. 1, taken along the line 2—2 of FIG. 1.

Referring to FIGS. 1 and 2, a preferred embodiment of an outer joint part 10 used as an outer member of a constant-velocity joint, according to the present invention, is now explained.

As illustrated in FIG. 1, the outer joint part 10 includes a cup-shaped body portion 12 and a shaft portion 13 integrally formed with the cup-shaped body portion 12. The cup-shaped body portion 12 has a rotation axis X and the shaft portion 13 extends axially outward, i.e. downward as viewed in FIG. 1, from a bottom of the cup-shaped body portion 12.

The cup-shaped body portion 12 has a generally spherical cavity. The cup-shaped body portion 12 includes a bulging portion at which the cavity is greater in diameter, and an open end portion at which the cavity is smaller in diameter. The cavity decreases in diameter toward the open end portion of the cup-shaped body portion 12. Namely, the bulging portion has an increased inner diameter and the open end portion has a reduced inner diameter smaller than the increased inner diameter of the bulging potion. Thus, the cup-shaped body portion 12 is formed of a so-called undercut shape.

The cup-shaped body portion 12 has an inner circumferential surface 12A defining the cavity and an outer circumferential surface 12B. The inner and outer circumferential surfaces 12A and 12B are formed of predetermined shapes, respectively and define between them the circumferential wall of the cup-shaped body portion.

A plurality of inner grooves 14 are formed on the inner circumferential surface 12A in a circumferentially distant relation to each other. In this embodiment, six inner grooves 14 are arranged circumferentially equidistantly about the rotation axis X. Each of the inner grooves 14 is disposed in a plane containing the rotation axis X. The inner groove 14 curvedly extends downward as viewed in FIG. 1, from the open end portion of the cup-shaped body portion 12 along the inner circumferential surface 12A, and terminates at a lower part of the inner circumferential surface 12A which is connected with an inner bottom surface 12C. The inner groove 14 has an arcuate section taken along the rotation axis X, as shown in FIG. 1. The inner grooves 14 are respectively so configured as to receive balls, one of which is indicated by a phantom line B in FIG. 2, of the joint. The inner grooves 14 permit a smooth sliding movement of the balls relative thereto. The inner grooves 14 have an arcuate shape in cross section taken in a direction perpendicular to the rotation axis X, as illustrated in FIG. 2.

A plurality of outer grooves 15 are formed on the outer circumferential surface 12B in a circumferentially alternate relation to the inner grooves 14. Namely, each of the outer grooves 15 is disposed between the adjacent two of the inner grooves 14. The outer grooves 15 are disposed in planes containing the rotation axis X. The outer grooves 15 extend substantially vertically downward as viewed in FIG. 1, from the open end portion of the cup-shaped body portion 12 and terminate before an outer bottom-surface of the cup-shaped body portion 12. The outer grooves 15 extend radially inward to be formed of a part-rectangular shape in cross section as shown in FIG. 2. The cup-shaped body portion 12 has a reduced wall thickness at the portion formed with the outer groove 15, which is smaller than a thickness at the remainder portion having no outer groove, as shown in FIG. 2. The portion formed with the outer groove 15 has a less rigidity at the portion formed with the outer grooves 15 than a rigidity at the remainder portion. Accordingly, the arrangement of the outer grooves 15 serves for enhancing formability of a workpiece when the workpiece is subject to plastic working to be formed into the outer joint part 10 having the reduced inner diameter open end portion. This allows reduction of a load required in the forming process, contributing to reduction of size of the equipment for making the outer joint part 10. In a case where the cup-shaped body portion 12 has no outer groove such as the outer grooves 15, the load required must be increased to a large extent. The increased load tends to cause a greater stress in dies in the forming process.

Figure 3:
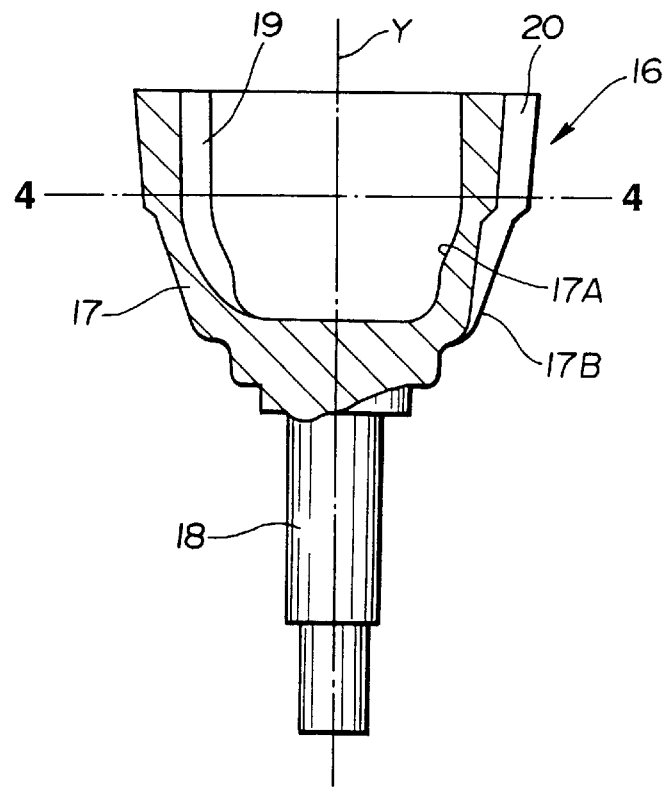
FIG. 3 is a section of a preform formed into the outer joint part of FIG. 1, taken along the line 3—3 of FIG. 4.
Figure 4:
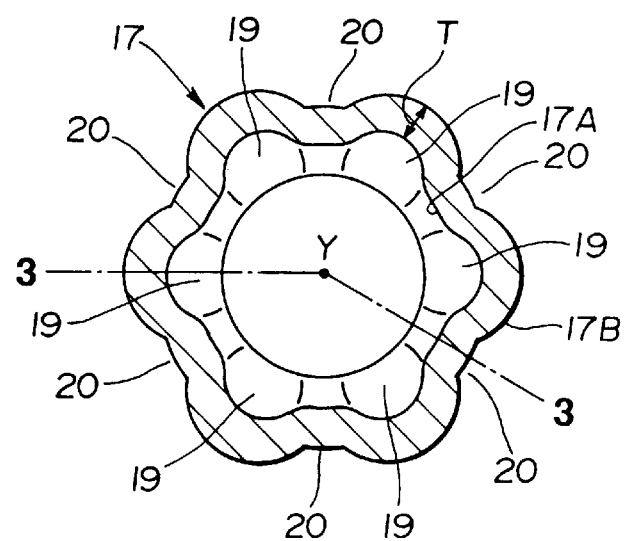
FIG. 4 is a cross section of the preform shown in FIG. 3, taken along the line 4—4 of FIG. 3.

Referring to FIGS. 3 and 4, a preform 16 subject to plastic working to form the outer joint part 10 described above, will be explained hereinafter. A workpiece is formed into the preform 16 in advance of being subject to plastic working.

As illustrated in FIG. 3, the preform 16 includes a bowl-shaped preform portion 17 and a shaft preform portion 18 integrally formed with the bowl-shaped preform portion 17. The bowl-shaped preform portion 17 has a center axis Y acting as the rotation axis X of the outer joint part 10 and the shaft preform portion 18 extends axially outward from a bottom of the bowl-shaped preform portion 17.

The bowl-shaped preform portion 17 has a circumferential wall defined by an inner circumferential surface 17A and an outer circumferential surface 17B similar to the inner circumferential surface 17A in shape. The bowl-shaped preform portion 17 has substantially a uniform wall thickness T in a cross section taken perpendicular to the center axis Y. The substantially uniform thickness T extends in a direction perpendicular to a tangent to a curve of one of the inner and outer circumferential surfaces 17A and 17B, which lies in a plane perpendicular to the center axis Y.

The inner circumferential surface 17A of the bowl-shaped preform portion 17 defines a plurality of inner recesses 19 circumferentially equidistant from each other. The inner recesses 19 are adapted to match in number with the inner grooves 14 of the cup-shaped body portion 12 of the finished outer joint part 10. The inner recesses 19 are six in this embodiment as shown in FIG. 4. The inner recesses 19 are disposed in planes containing the center axis Y. Each of the inner recess 19 includes a vertical recess portion extending substantially vertically downward as viewed in FIG. 3, from an open end of the bowl-shaped preform portion 17 and a bending recess portion inward curving and terminating at an inner bottom surface of the bowl-shaped preform portion 17. The inner recess 19 has an arcuate shape in cross section, as illustrated in FIG. 4.

The outer circumferential surface 17B of the bowl-shaped preform portion 17 defines a plurality of outer recesses 20 arranged circumferentially alternately relative to the inner recesses 19. The outer recesses 20 are equidistantly spaced apart from each other. Each of the outer recesses 20 is disposed between the adjacent two of the inner recesses 19. The outer recesses 20 are disposed in planes containing the center axis Y, as well as the inner recesses 19 are. The outer recesses 20 match in number with the outer grooves 15 of the cup-shaped body portion 12 of the finished outer joint part 10.

Figure 5:
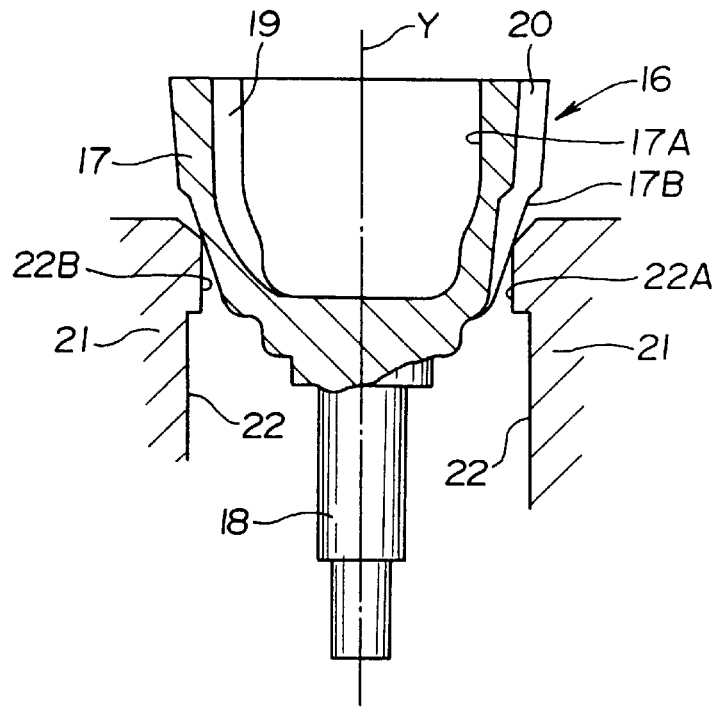
FIG. 5 is a section of the preform and an outer die, taken in a direction of a center axis Y.
Figure 6:
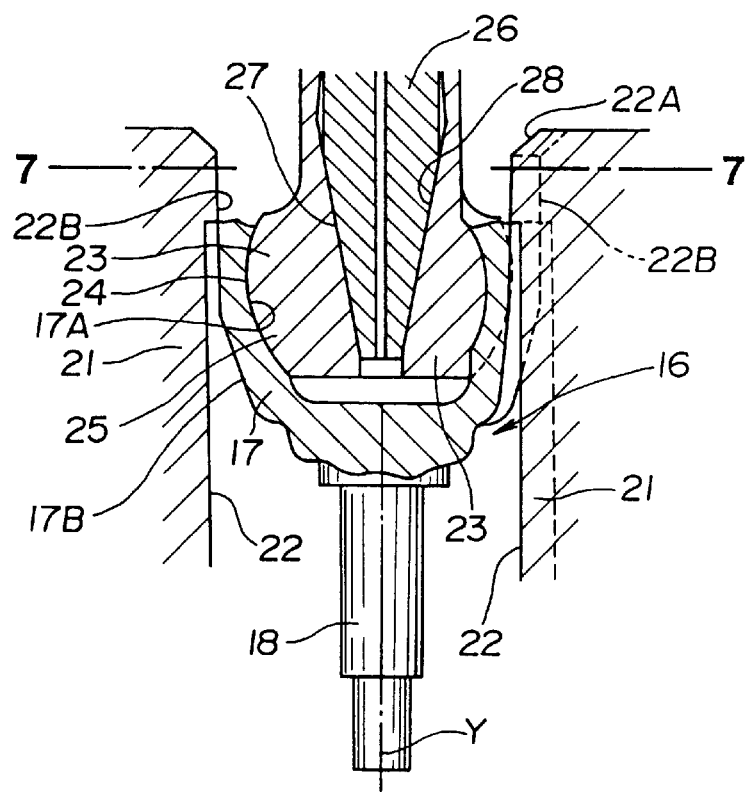
FIG. 6 is a section of the preform and inner and outer dies, taken along the line 6—6 of FIG. 7.
Figure 7:
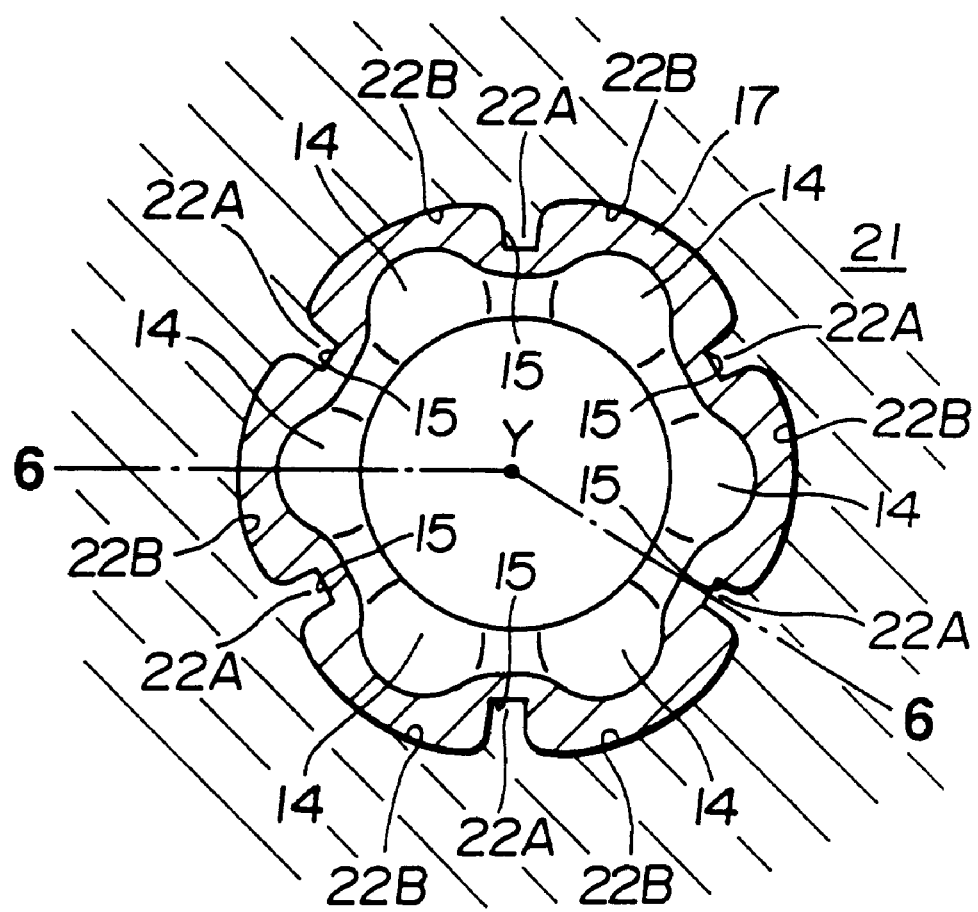
FIG. 7 is a cross section taken along the line 7—7 of FIG. 6, showing the outer die and the preform in the forming position.

The preform 16 is formed into the outer joint part 10 by using apparatus shown in FIGS. 5, 6 and 7. The apparatus includes an outer die 21, an inner die 23 disposed inside the outer die 21 and a mandrel 26 adapted to move the inner die 23 relative to the outer die 21. The outer die 21 has, on its inner periphery, a control surface 22 coming into engagement with the outer circumferential surface 17B of the bowl-shaped preform portion 17 of the preform 16 to configure the outer circumferential surface 17B to the predetermined shape of the outer circumferential surface 12B of the cup-shaped body portion 12 of the outer joint part 10. As illustrated in FIG. 6, the outer die 21 has a plurality of projections 22A projecting inward from the inner periphery of the outer die 21 and having a predetermined axial length. The projections 22A form a part of the control surface 22 and configure the outer grooves 15 of the outer circumferential surface 12B. The projections 22A are circumferentially equidistant from each other, between the adjacent two of which a control surface portion 22B extends as best shown in FIG. 7. The outer die 21 includes a die base, not shown, and a plurality of outer die segments 21 mounted on the die base. The outer die segments 21 are circumferentially spaced apart from each other and adapted to move in a direction perpendicular to the center axis Y of the bowl-shaped preform portion 17 of the preform 16. Thus, the outer die segments 21 are moveable in a radial direction of the bowl-shaped preform portion 17. The outer die segments 21 have the projections 22A, respectively.

As illustrated in FIG. 6, the inner die 23 has, on its outer periphery, a round control surface 24 coming into engagement with the inner circumferential surface 17A of the bowl-shaped preform portion 17 of the preform 16 to configure the inner circumferential surface 17A to the predetermined shape of the inner circumferential surface 12A of the cup-shaped body portion 12 of the outer joint part 10. The inner die 23 is formed with a plurality of projections 25 bulging outward from the outer periphery of the inner die 23 and having a predetermined axial length. Each of the projections 25 has an arcuate section as shown in FIG. 6. The projections 25 form a part of the control surface 24 and configure the inner grooves 14 of the inner circumferential surface 12A. The projections 25 project outward from an outer circumferential surface of the inner die 23 and have a predetermined axial length. The projections 25 are circumferentially equidistantly spaced from each other. The inner die 23 includes a plurality of inner die segments 23 circumferentially spaced apart from each other and adapted to move along the center axis Y of the bowl-shaped preform portion 17 and in the direction perpendicular to the center axis Y. The inner die segments 23 are moveable in axial and radial directions of the bowl-shaped preform portion 17. The inner die segments 23 have the projections 25, respectively.

The mandrel 26 is so disposed and arranged as to be moveable into and out of a die cavity of the inner die 23. The mandrel 26 has, on its frustoconical end portion, a sloped surface 27 engaged with an inclined surface 28 formed on an inner peripheral surface of each inner die segment 23. The mandrel 26 forces the inner die segments 23 to move radially outward and inward by applying a pressure force to the inclined surface 28 through the sloped surface 27.

Referring to FIGS. 5 and 6, steps of forming the preform 16 into the outer joint part 10 will be explained hereinafter.

First, the preform 16 is moved into a die cavity of the outer die 21 by moving the outer die segments 21 radially outward. The preform 16 is further inward moved from an initial position shown in FIG. 5, to a forming position shown in FIG. 6. In the forming position, the bowl-shaped preform portion 17 is placed within the die cavity of the outer die 21 together with the shaft preform portion 18. At this time, the preform 16 is placed in such an angular position relative to the outer die segments 21 that the outer recesses 20 of the bowl-shaped preform portion 17 are opposed to the projections 22A of the outer die segments 21.

Next, the inner die segments 23 are moved into a cavity of the bowl-shaped preform portion 17 of the preform 16 located in the forming position. The inner die segments 23 are placed in such an angular position relative to the preform 16 that the projections 25 of the inner die segments 23 are opposed to the inner recesses 19 of the bowl-shaped preform portion 17.

Then, the mandrel 26 advances to the die cavity of the inner die 23 and forces the inner die segments 23 to move radially outward to a pressing position of the inner die where the control surface 24 presses on the inner circumferential surface 17A of the bowl-shaped preform portion 17. At the same time, the outer die segments 21 move radially inward to press the control surface 22 against the outer circumferential surface 17B of the bowl-shaped preform portion 17. Thus, when the preform 16 is placed in the forming position, the outer die segments 21 and the inner die segments 23 cooperate to conform the inner and outer circumferential surfaces 17A and 17B of the bowl-shaped preform portion 17 to the control surfaces 24 and 22. In this manner, the bowl-shaped preform portion 17 of the preform 16 is formed with respective configurations on the inner and outer circumferential surfaces 17A and 17B. As a result, the bowl-shaped preform portion 17 of the preform 16 is formed into the cup-shaped body portion 12 of the outer joint part 10 which has the predetermined shapes on the inner and outer circumferential surfaces 12A and 12B. Simultaneously, in the forming process of the cup-shaped body portion 12, the shaft preform portion 18 of the preform 16 is formed into the shaft portion 13 of the outer joint part 10. The outer joint part 10 is then completed. After that, the finished outer joint part 10 is removed from the inner and outer dies 21 and 23 by an operation reverse to the above-explained one.

As will be appreciated from the above description, the bowl-shaped preform portion 17 of the preform 16 can be easily formed into the cup-shaped body portion 12 of the outer joint part 10 which has the predetermined shape on the inner circumferential surface 12A. This is because the bowl-shaped preform portion 17 having substantially the uniform thickness T in the cross section taken in the direction perpendicular to the center axis Y has substantially uniform rigidity.

Further, in the case of forming the preform 16 into the outer joint part 10 of the so-called undercut shape which has a reduced inner diameter at the open end portion, it is not required that the preform 16 is subject to machine working to increase the inner diameter of the bowl-shaped preform portion 17 after the forming steps explained above. This contributes to saving of the manufacturing cost and then dispensing with grinding work for finishing the inner grooves 14 on the cup-shaped body portion 12 of the outer joint part 10.

What is claimed is:

1. An outer joint part for a constant velocity ball joint, comprising:

a cup-shaped body portion having a rotation axis, said cup-shaped body portion having a cavity, an inner circumferential surface within said cavity, an outer circumferential surface, and an axially open end portion opening into said cavity, said inner and outer circumferential surfaces defining therebetween a circumferential wall of said cup-shaped body portion;

a plurality of inner grooves formed on the inner circumferential surface of the cup-shaped body portion in circumferentially spaced relation to each other;

a plurality of outer grooves formed on the outer circumferential surface of the cup-shaped body portion in circumferentially alternate relation to the plurality of inner grooves, said outer grooves extending from said axially open end portion to at least substantially half the axial length of said cavity, wherein the wall thickness of the cup-shaped body portion at the outer grooves is smaller than the wall thickness of the cup-shaped body portion in the areas between the outer grooves; and wherein each of the plurality of outer grooves of the cup-shaped body portion is defined by at least two substantially parallel side surfaces and a planar surface between the substantially parallel surfaces.

* * * * *